United States Patent [19]

Steiner et al.

[11] Patent Number: 5,548,704

[45] Date of Patent: Aug. 20, 1996

[54] METHOD FOR WINDOWING USING MAINFRAME HOSTED CICS

[75] Inventors: John E. Steiner; Michael P. Egbert, both of West Palm Bch., Fla.

[73] Assignee: The Consulting Team, Inc., West Palm Beach, Fla.

[21] Appl. No.: 336,843

[22] Filed: Nov. 8, 1994

[51] Int. Cl.$^6$ ....................................................... G06F 3/00
[52] U.S. Cl. ............................................................ 395/158
[58] Field of Search .................................. 395/155–161, 395/650, 700; 364/286, 927.63, 286.3, 146; 345/119–120

[56] References Cited

U.S. PATENT DOCUMENTS 4,858,152  8/1989  Estes ........................................ 395/161
5,428,782  6/1995  White ....................................... 395/650

Primary Examiner—Mark R. Powell
Assistant Examiner—John E. Breene
Attorney, Agent, or Firm—McHale & Slavin, P.A.

[57]  ABSTRACT

A method of synchronizing CICS data streams with a sequence of user interface contexts for use with automated time and attendance computer programs and the like systems which operate in a mainframe environment having CICS with extended attributes feature. The present invention provides a windowing type scheme allowing an operator overlay information panes and store changes made on the bit map thereby incorporating the video display of a changed bit map into an overlay pane.

7 Claims, 1 Drawing Sheet

METHOD FOR WINDOWING USING MAINFRAME HOSTED CICS

FIELD OF THE INVENTION

The invention relates to window images for computer programs and, more particular, to the management of computer program user interface contexts and their corresponding processing control elements to present a video display composed of overlapping window images while using mainframe-hosted CICS.

BACKGROUND OF THE INVENTION

Automated time and attendance systems have become increasingly popular for collection of time sheet data for payroll processing. Improvements in the payroll processing systems permit management with the information necessary to devise more effective schedule and programs to control or reduce wages, salaries and fringe benefits. Such systems are typically incorporated into a mainframe computer having the storage and procession capability to manage large amount of data.

A problem with the prior art revolves around the inputing and presentation of information. Computer programs of the prior art typically employ a video display scheme that produces rectangular images through which the computer program and the user communicate. Such a rectangular image, commonly known as a window, is the video display manifestation of the program's current input/output data exchange with the user. All of the computer program's interaction with the user occurs through this kind of user interface relying on multiple, often overlapping, windows. Each window is the visual aspect of a particular user interface context. To properly handle the sequencing of user interface contexts as windows are created and destroyed the program must manage numerous processing control elements. These processing control elements define the program's processing states for active and pending user interface contexts represented by windows on the display screen.

The task of sequencing user interface contexts minimally requires that the processing control elements handle operations in two functional categories—the video display and user input. The video display handling is required to maintain window images which correspond to user interface contexts without incurring unsightly side effects or inconvenient delays. Likewise, the user input must be received and interpreted in correspondence with a particular user interface context. Doing this efficiently when multiple user interface contexts are layered upon one another requires complex and sophisticated processing control operations.

CICS, the Customer Information Communications System, is an IBM software product which allows terminal users to access mainframe programs for on-line transaction processing. Prior to its introduction in 1969, batch data processing was used for transaction processing. CICS has since become the standard facility through which on-line processing occurs for mainframes. CICS is the software interface between the mainframe data processing application program and a user's terminal, such as an IBM 3270. CICS is primarily concerned with managing the flow of data streams between the mainframe application program and the user's terminal. A crucial facet of the data stream management is formatting the data as it appears to the user on the terminal.

The customary manner of presenting multiple user interface contexts in a CICS computer program does not include any form of windowing. A CICS program requires clearing the display screen while making a transition from one user interface display to another. No more than one user interface context is ever visible. Also in a CICS program, the video screen arrangement and the related user input fields for a particular user interface context are defined together as an integral unit. These discrete user interface context definitions are the fundamental units upon which a windowing scheme must be devised for CICS programs. To implement in a CICS program such a windowing scheme capable of displaying the multilayered presentation of windows representing a cascade of user interface contexts requires special synchronization of the data streams between the application program and the user's terminal. The program's processing control elements provide the user interface context sequencing to perform this synchronization. Also needed are special video display design techniques to overcome the intrinsic limitations of CICS display capabilities.

Most of the contemporary computer user interfaces include some form of windowing. The expansive acceptance of products like Microsoft's WINDOWS (tm) and the Common User Access (CUA) user interface design standard developed by IBM attest to the need for computer program windowing capabilities. Yet CICS, itself, lacks any facility to directly provide windowing within a computer program operating on a personal computer or intelligent work station. CICS, though, is in use on a vast number of personal computers and intelligent work stations to support the on-line transaction processing needs of businesses around the world.

Thus what is lacking in the art is the ability to synchronize CICS data streams with a sequence of user interface contexts and the appropriate video display design techniques to accomplish windowing.

SUMMARY OF THE INVENTION

The ability to synchronize CICS data streams with a sequence of user interface contexts have found particular application with the applicant's automated time and attendance systems. In such systems, the automated time and attendance system operates in a mainframe environment requiring CICS version 1.6 or above with CICS'S extended attributes feature. The system operates under VSAM, DB2 running under MVS/XA/ESA or VSE/ESA. Due to the size of the applicant's software program and associated complexities, over 200 display screens are used to accommodate a wide range of on-line interactive updating and displaying.

CICS manages the flow of data between an application program running on a mainframe computer and a remotely located user terminal consisting of a keyboard and a video display device with certain logic and storage facilities. When IBM 3270-type terminals are used the data flow consists of native-mode 3270 data streams. Personal computers or intelligent work stations capable of 3270 emulation are also in common use as terminals. CICS employs numerous programs to manage the 3270 data streams. Several of these programs are directly involved in the operation of the present invention. The terminal control program (TCP) is directly responsible for transmissions between the application program and CICS system running on the mainframe and the terminal devices. The storage control program (SCP) and temporary storage program (TSP) are facilities used to manage data in main storage and temporary storage, respectively.

The content of the 3270 data stream determines the arrangement and behavior of video display elements and the data values associated with user input. The video display elements and their corresponding data entry values are called fields. All field properties such as basic display characteristics, display location, cursor behavior, etc. are specified by the field attributes. Advanced display characteristics such as color and reverse video require extended attributes. The present invention relies on the support of extended attributes. A 3270 data stream is composed primarily of fields and field attributes. The field attributes occupy one or more bytes in the data stream immediately preceding the field to which they pertain. Thus the fields, their attributes and the field ordering determine the format and behavior of a video display screen.

CICS includes a programming facility for specifying the format and behavior of video display screens. This facility is Basic Mapping Services (BMS). A programmer creates and maintains BMS maps. The BMS maps are incorporated into an application program to supply the program with a user interface which is executed via CICS. A single BMS map defines a single video display screen. Hence, in the present invention a particular user interface context and its associated 3270 data stream is specified by a BMS map.

When the application program executes a "Send Map" CICS command, a 3270 data stream is transmitted to the remote terminal where the terminal's logic circuitry translates the data stream into a formatted data entry screen. The TCP records data changes resulting from user input to the data entry screen. When the application program executes a "Receive Map" CICS command, the data changes recorded by the TCP are formatted in accordance with the map specifications and then made available to the application program. A simple usage cycle of a single user interface context in the present invention is delineated by the sending and the receiving of a single map.

The present invention's windowing scheme is described in terms of base panes, overlay panes, base maps and secondary maps. For instance, if an operator chooses to view a particular listing, such as a maintenance record, the operator can "explode" the record by moving the cursor to the record sought to be viewed and by depressing a function key, in this instance PF6, the record over lays a portion of the existing screen. The base pane is a window protected from a base map data stream such as the previously described screen displayed record. The overlay pane may either partially or completely cover the base pane and may provide help information for the user. If the operator changes information shown on the overlay, the change is stored in a bit mat wherein the information can be incorporated into an otherwise normal overlay pane.

Thus, a primary objective of the invention is to synchronize CICS data streams with a sequence of user interface contexts.

Still another objective of the invention is to teach rules and guidelines for composing BMS maps for base panes and overly panes.

Another objective is to provide a means for incorporating the video display of a changed bit map into an overlay pane.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION

Figure 1:
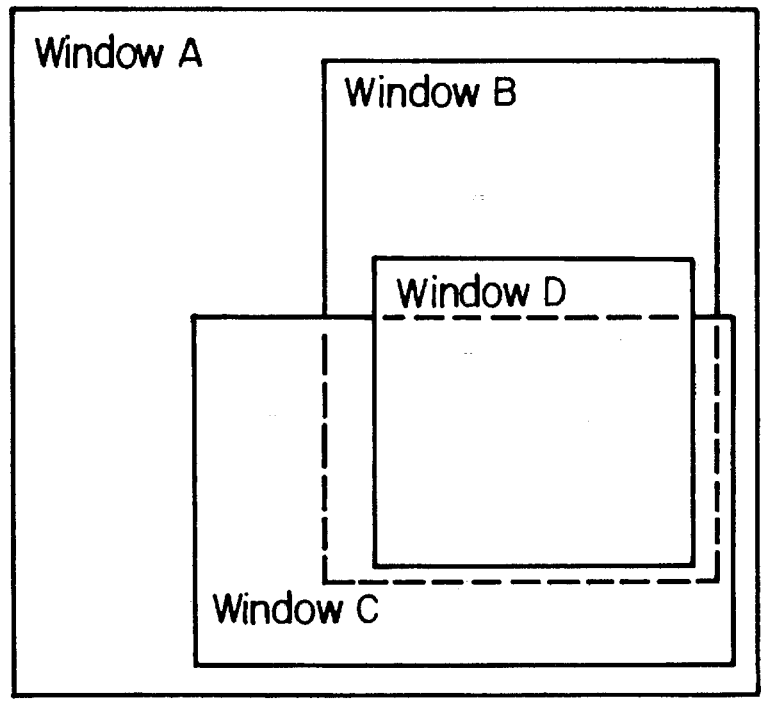
FIG. 1 is a pictorial representation of the windowing panes and bit maps defined by the instant invention.

Although the invention has been described in terms a specific embodiment, it will be readily apparent to those skilled in this art that various modifications, rearrangements and substitutions can be made without departing from the spirit of the invention. The scope of the invention is defined by the claims appended hereto.

CICS manages the flow of data between an application program running on a mainframe computer and a remotely located user terminal consisting of a keyboard and a video display device with certain logic and storage facilities. When IBM 7 3270-type terminals are used the data flow consists of native-mode 3270 data streams. Personal computers or intelligent work stations capable of 3270 emulation are also in common use as terminals. CICS employs numerous programs to manage the 3270 data streams. Several of these programs are directly involved in the operation of the present invention. The terminal control program (TCP) is directly responsible for transmissions between the application program and CICS system running on the mainframe and the terminal devices. The storage control program (SCP) and temporary storage program (TSP) are facilities used to manage data in main storage and temporary storage, respectively.

The content of the 3270 data streams determine the arrangement and behavior of video display elements and the data values associated with user input. The video display elements and their corresponding data entry values are called fields. All field properties such as basic display characteristics, display location, cursor behavior, etc. are specified by the field attributes. Advanced display characteristics such as color and reverse video require extended attributes. The present invention relies on the support of extended attributes. A 3270 data stream is composed primarily of fields and field attributes. The field attributes occupy one or more bytes in the data stream immediately preceding the field to which they pertain. Thus the fields, their attributes and the field ordering determine the format and behavior of a video display screen.

CICS includes a programming facility for specifying the format and behavior of video display screens. This facility is Basic Mapping Services (BMS). A programmer creates and maintains BMS maps. The BMS maps are incorporated into an application program to supply the program with a user interface which is executed via CICS. A single BMS map defines a single video display screen. Hence, in the present invention a particular user interface context and its associated 3270 data stream is specified by a BMS map.

When the application program executes a "Send Map" CICS command, a 3270 data stream is transmitted to the remote terminal where the terminal's logic circuitry translates the data stream into a formatted data entry screen. The TCP records data changes resulting from user input to the data entry screen. When the application program executes a "Receive Map" CICS command, the data changes recorded by the TCP are formatted in accordance with the map specifications and then made available to the application program. A simple usage cycle of a single user interface context in the present invention is delineated by the sending and the receiving of a single map.

FIG. 1 depicts a possible multilayered window configuration resulting from a "nesting" or cascade of user interface contexts. Note that each window on a video display resulted from a 3270 data stream, which, in turn, resulted from the run-time execution of a BMS map.

The present invention's windowing scheme is described in terms of base panes, overlay panes, base maps and secondary maps. Referring to FIG. 1, window A is a base pane with respect to windows B and C, while windows B and C are overlay panes with respect to window A. Similarly, window D is an overlay pane with respect to windows B and C, and windows B and C are base panes with respect to window D. The data stream which produced window A resulted from a base map. Windows B, C & D all resulted from data streams produced by secondary maps. In a collection of windows, there will always be a base pane which cannot also be an overlay pane. This base pane will correspond to one or more base maps. An overlay pane will always correspond to a secondary map.

Continuing with FIG. 1, window B is a partial overlay pane with respect to window A because it only partially covers window A. Likewise window B is a partial overlay pane with respect to window A, window C is a partial overlay pane with respect to windows A and B and window D is a partial overlay pane with respect to windows B and C. As a complete overlay pane renders its base pane invisible, it is difficult to illustrate. But envision an instance where window B would immediately follow window A before window B in the windowing sequence of FIG. 1, i.e. a window sequence from bottom to top of A, D, B, C rather than the sequence of A, B, C, D as is shown. In such a case, window B would be a complete overlay pane with respect to window D.

During the process of creating and destroying overlay panes, the present invention must refer to video display information and processing control elements at various stages of the process. This is accomplished by combining the relevant field attribute values and process control variable values into bit patterns which can then be recorded for future reference. The resulting bit patterns are stored in files called bit maps.

The present invention further includes the capability of allowing a user to change and record the text contained within an overlay pane. This feature is particularly valuable in the instance where an overlay pane contains help information for the user. With this feature users can, when allowed, append informative help text to expand on that already present. Any overlay contents changed by a user are stored in a file that is called a changed bit map. The present invention employs a technique for incorporating the video display effects of a changed bit map into an otherwise normal overlay pane.

The bit map is the result of saving the base map onto a temporary storage queue. A TS-QUEUE must be defined to contain the whole map image (including Orders and Attributes). Each map that will be overlaid must have a temporary storage queue defined for the map. The algorithm for saving/restoring the bit map, is a FILO (First In Last Out) method. Here the temporary storage queue is used as a Stack. This Stack then becomes the repository for maps to be saved (Pushed) or restored (Popped). An item number is assigned to the queue. This item number will be incremented monotonically for subsets of the base map. An example would be if a base map (Map-A) was to be overlaid with children maps (CMap-1) and (CMap-2); and then all maps were to be overlaid by a new Parent (Map-B), the following steps would need to be done to accomplish the creation of bit maps and the handling of these bit maps to successfully restore the screen to the original Parent:

1. A TS-Queue defined for Map-A (Length of largest Map)
2. A TS-Queue defined for Map-B
3. Push Map-A with item #1 to Queue-A (A Rewrite Queue with the IOAREA pointing to the actual Map I/O Group.)
   * This creates the Bit Map of Map-A
4. Send CMap-1
5. Push CMap-1 with item #2 to Queue-A
6. Send CMap-2
7. Push CMap-2 with item #3 to Queue-A
8. Request for new Parent
   a. Send Map-B
   b. Push Map-B onto Queue-B
   c. Process until request to Parent-A Flow can now be controlled between two distinct Parents. Bit Maps have been created for each Parent and child maps (if present.) If fast pathing is to be performed between the two parents, then Popping off the TS-Queues restores the prior instance.

The present invention further employs techniques for rapid access of stored bit maps to eliminate unsightly video side effects resulting from slowly redrawing windows on the display screen. These techniques provide for smooth, visually attractive and convenient windowing presentations.

The handling of the Bit Maps is performed by utilizing the MAIN option in the WRITE TSQUEUE Command. By using MAIN (as opposed to AUXILIARY), the propensity for causing SIO's to manage the Bit Maps is virtually eliminated. IBM has greatly enhanced the Temporary Storage Management in CICS 3.n. Threaded Management allows the use of MAIN to be extremely fast and efficient. Due to the transient nature of Bit Maps, the life span is short and memory resources are managed quite nicely. By handling multiple instances of Bit Maps in MAIN Temporary Storage, we have virtually no processing overhead of rebuilding the BMS Dsects and associated I/O. The result is a smooth transition of Parent/Child Maps relative to Screen I/O processing. Popping from a TS MAIN Queue into an IOAREA for SEND MAP, eliminates any I/O Re-building; and the MAIN option eliminates the TS-Queue I/O Auxiliary Storage. Transaction Backout is not an issue.

As with its video display limitations, CICS makes no provisions for directly controlling the data entry cursor in multiple user interface contexts. Yet when an overlay pane intended for data entry use is created, the active cursor must shift from the base pane to the overlay pane. Since prescribed CICS usage does not consider the possibility of windowing, the present invention also includes a special technique for manipulating the data entry cursor in overlay panes.

When a Parent Map is overlaid with a Child, all open attributes, ie. (unprotected), must be turned off if the Child map will have cursor control with in its pane. To accomplish this control we first execute the defined Bit Map Save; then a SEND MAP (DATAONLY) is issued for the Parent or Base Map; only after all Unprotected attributes have been set to ASKIP/FSET. Once the SEND MAP (DATAONLY) has been issued, then the Child or overlay pane can be sent. Cursor movement is restricted within the child pane. This is the result of all fields being set to ASKIP/FSET. Only the unprotected attributes are available. This manages the cursor control within the active pane. If subsequent child maps are to be processed, then the same algorithm will be applied at the next level. As the application moves backward (Popping to prior instance), we apply the Bit Map Restore, (which contains the attributes preserved in their original functional state.)

Among the techniques employed by the present invention are those applied when the CICS application program is being designed. Some rules and guidelines must be followed when composing the BMS maps for the base pane and the overlay panes. The first of these rules establish a technique for preserving the intended appearance of an overlay pane by preventing the video display elements of its base pane from "bleeding through". These rules are:

1. All areas of an overlay pane must be defined with the REVERSE VIDEO attribute.
2. All areas, including those defined with the ASKIP attribute, must be defined as an unused character areas by assigning a hexadecimal value of 40.
3. All ASKIP areas additionally set the FSET and DARK attributes.

These rules prevent the standard use of hexadecimal 00 as the fill character, as is the default operation of CICS.

Additional design guidelines concern the relative video display positioning of particular base map fields and any subsequent overlay panes and establish a technique vital to a CICS windowing scheme. Certain field attributes in the base map are critical to preserving the user interface context-to- 3270 data stream synchronization while windowing and therefore must never be overwritten by the field attributes resulting from a secondary map used to produce an overlay pane. Hence, when composing secondary maps for overlay panes, careful window placement planning and an awareness of critical base map field locations is required for successful windowing.

It is imperative to follow the design restrictions and map constructs discussed. The visual presentation of Base and Overlap Maps is dependent upon the following design considerations:

Rule 1

When designing an overlap, you must consider the X, Y location relative to the Base Map. If the overlay map will not cover the complete area of the right most part of the Base Map, then the overlay map must not be positioned (X, Y) on any part of the (Orders and Attribute SBA, SF) of the Base Map. The overlay map must be right justified and cover the right most area of the intersecting panes. If the design is not done as described, the result will turn off the extended attributes of the base map.

Rule 2

All considerations from Rule 1 apply. Rule 2 deals with overlays that cross the complete pane of the base map. The only consideration is that the ending area of the overlay map intersect or go beyond the end of the base map. Combinations of child maps can be accomplished by following Rule 1 and Rule 2.

Rule 3

Figure 2:
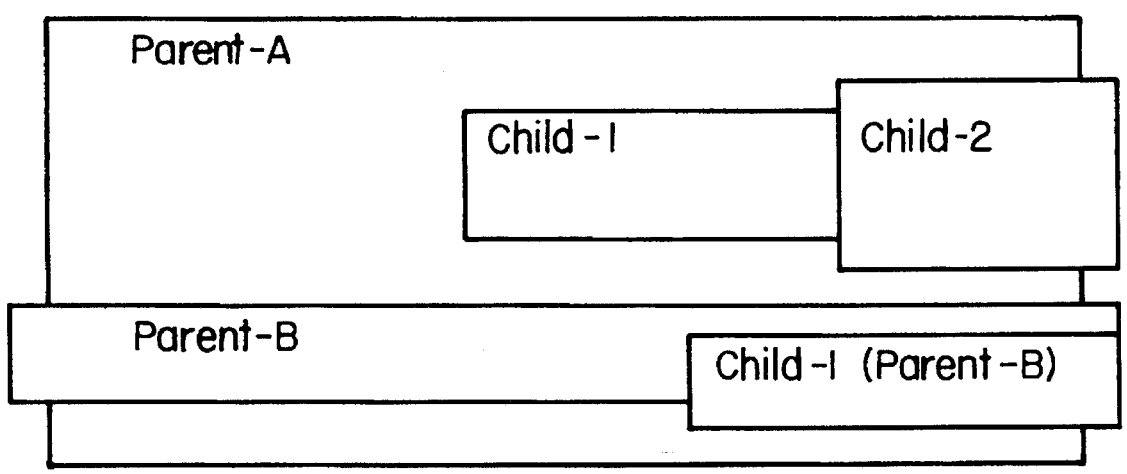
FIG. 2 is a pictorial example of bit map positioning.

All non-display characters must be defined as spaces in the map with an attribute of ASKIP/FSET. This prevents the Base Map from bleeding through. Areas that are perceived to cover the Base Map with extended attributes (REVERSE VIDEO) also must be defined as character strings with spaces. FIG. 2 portrays the application of the aforementioned rules wherein the illustration of is permissible and will not destroy any base map panes. The following source code sets forth a working example of the windowing scheme.

```
17    IN353AM   DFHMSD TYPE=,                        C
18              CTRL=(FRSET,FREEKB),                 C
19              EXTATT=YES,                          C
20              TIOAPFX=YES,                         C
21              MODE=INOUT,                          C
22              LANG=COBOL,                          C
23              STORAGE=AUTO
24    IN353AM   DFHMDI CTRL=(FRSET,FREEKB),          C
25              EXTATT=YES,                          C
26              TIOAPFX=YES,                         C
27              SIZE=(24,80),                        C
28              COLUMN=0001,                         C
29              LINE=0001
30              DFHMDF INITIAL='                     C
31              POS=(1,17),                          C
32              LENGTH=49,                           C
33              COLOR=BLUE,                          C
34              HILIGHT=REVERSE,                     C
35              ATTRB=ASKIP
36              DFHMDF POS=(1,67),                   C
37              LENGTH=1,                            C
38              ATTRB=(ASKIP,DRK)
39              DFHMDF INITIAL=' ',                  C
```

```
 1                  POS=(2,17),                                    C
 2                  LENGTH=1,                                      C
 3                  COLOR=BLUE,                                    C
 4                  HILIGHT=REVERSE,                               C
 5                  ATTRB=ASKIP
 6          DFHMDF INITIAL='    T.A.M.S.    DEMOGRAPHIC    PROFILE    'C
 7                  POS=(2,19),                                    C
 8                  LENGTH=45,                                     C
 9                  COLOR=NEUTRAL,                                 C
10                  HILIGHT=REVERSE,                               C
11                  ATTRB=ASKIP
12          DFHMDF INITIAL=' ',                                    C
13                  POS=(2,65),                                    C
14                  LENGTH=1,                                      C
15                  COLOR=BLUE,                                    C
16                  HILIGHT=REVERSE,                               C
17                  ATTRB=ASKIP
18          DFHMDF POS=(2,67),                                     C
19                  LENGTH=1,                                      C
20                  ATTRB=(ASKIP,DRK)
21          DFHMDF INITIAL='COMPANY:',                             C
22                  POS=(3,9),                                     C
23                  LENGTH=8,                                      C
24                  COLOR=TURQUOISE,                               C
25                  ATTRB=ASKIP
26          DFHMDF POS=(3,18),                                     C
27                  LENGTH=1,                                      C
28                  ATTRB=(ASKIP,DRK)
29  APCOMP  DFHMDF INITIAL='      ',                               C
30                  POS=(3,20),                                    C
31                  LENGTH=6,                                      C
32                  COLOR=YELLOW,                                  C
33                  ATTRB=(ASKIP,BRT,FSET)
34          DFHMDF POS=(3,27),                                     C
35                  LENGTH=1,                                      C
36                  ATTRB=(ASKIP,DRK)
37          DFHMDF INITIAL=' INSERT ',                             C
38                  POS=(3,35),                                    C
39                  LENGTH=8,                                      C
40                  COLOR=YELLOW,                                  C
41                  HILIGHT=UNDERLINE,                             C
42                  ATTRB=(ASKIP,BRT,FSET)
43          DFHMDF POS=(3,44),                                     C
44                  LENGTH=1,                                      C
45                  ATTRB=(ASKIP,DRK)
46          DFHMDF INITIAL='PAY-GRP:',                             C
47                  POS=(3,54),                                    C
48                  LENGTH=8,                                      C
49                  COLOR=TURQUOISE,                               C
50                  ATTRB=ASKIP
51          DFHMDF POS=(3,63),                                     C
52                  LENGTH=1,                                      C
53                  ATTRB=(ASKIP,DRK)
54  APPAYG  DFHMDF INITIAL='      ',                               C
55                  POS=(3,65),                                    C
56                  LENGTH=6,                                      C
57                  COLOR=YELLOW,                                  C
58                  ATTRB=(ASKIP,BRT,FSET)
59          DFHMDF POS=(3,72),                                     C
60                  LENGTH=1,                                      C
61                  ATTRB=(ASKIP,DRK)
62          DFHMDF INITIAL='LOCATION--CD:',                        C
```

```
 1                       POS=(4,9),                                              C
 2                       LENGTH=13,                                              C
 3                       COLOR=TURQUOISE,                                        C
 4                       ATTRB=ASKIP
 5               DFHMDF POS=(4,23),                                              C
 6                       LENGTH=1,                                               C
 7                       ATTRB=(ASKIP,DRK)
 8  APDIST      DFHMDF INITIAL='_____',                                          C
 9                       POS=(4,25),                                             C
10                       LENGTH=5,                                               C
11                       COLOR=YELLOW,                                           C
12                       ATTRB=(UNPROT,BRT,IC,FSET)
13               DFHMDF POS=(4,31),                                              C
14                       LENGTH=1,                                               C
15                       ATTRB=(ASKIP,DRK)
16               DFHMDF INITIAL='REPORTER:',                                     C
17                       POS=(4,54),                                             C
18                       LENGTH=9,                                               C
19                       COLOR=TURQUOISE,                                        C
20                       ATTRB=ASKIP
21               DFHMDF POS=(4,64),                                              C
22                       LENGTH=1,                                               C
23                       ATTRB=(ASKIP,DRK)
24  APRPTR      DFHMDF INITIAL='       ',                                        C
25                       POS=(4,66),                                             C
26                       LENGTH=7,                                               C
27                       COLOR=YELLOW,                                           C
28                       HILIGHT=UNDERLINE,                                      C
29                       ATTRB=(UNPROT,BRT,FSET)
30               DFHMDF POS=(4,74),                                              C
31                       LENGTH=1,                                               C
32                       ATTRB=(ASKIP,DRK)
33               DFHMDF INITIAL=' E M P L O Y E E    I N F O R M A T I O N
34                       POS=(5,3),                                              C
35                       LENGTH=75,                                              C
36                       COLOR=TURQUOISE,                                        C
37                       HILIGHT=REVERSE,                                        C
38                       ATTRB=ASKIP
39               DFHMDF POS=(5,79),                                              C
40                       LENGTH=1,                                               C
41                       ATTRB=(ASKIP,DRK)
42               DFHMDF INITIAL='ACCOUNT-ID:',                                   C
43                       POS=(6,3),                                              C
44                       LENGTH=11,                                              C
45                       COLOR=TURQUOISE,                                        C
46                       ATTRB=ASKIP
47               DFHMDF POS=(6,15),                                              C
48                       LENGTH=1,                                               C
49                       ATTRB=(ASKIP,DRK)
50  APACCT      DFHMDF INITIAL='                              ',                 C
51                       POS=(6,17),                                             C
52                       LENGTH=30,                                              C
53                       COLOR=NEUTRAL,                                          C
54                       ATTRB=(UNPROT,BRT,FSET)
55               DFHMDF POS=(6,48),                                              C
56                       LENGTH=1,                                               C
57                       ATTRB=(ASKIP,DRK)
58               DFHMDF INITIAL='SOC-SEC-NO:',                                   C
59                       POS=(6,51),                                             C
60                       LENGTH=11,                                              C
61                       COLOR=TURQUOISE,                                        C
62                       ATTRB=ASKIP
```

```
 1    APSOC1     DFHMDF INITIAL='___',                 C
 2               POS=(6,63),                           C
 3               LENGTH=3,                             C
 4               COLOR=NEUTRAL,                        C
 5               ATTRB=(UNPROT,NUM,BRT,FSET)
 6               DFHMDF INITIAL='-',                   C
 7               POS=(6,67),                           C
 8               LENGTH=1,                             C
 9               COLOR=NEUTRAL,                        C
10               ATTRB=(ASKIP,BRT)
11    APSOC2     DFHMDF INITIAL='__',                  C
12               POS=(6,69),                           C
13               LENGTH=2,                             C
14               COLOR=NEUTRAL,                        C
15               ATTRB=(UNPROT,NUM,BRT,FSET)
16               DFHMDF INITIAL='-',                   C
17               POS=(6,72),                           C
18               LENGTH=1,                             C
19               COLOR=NEUTRAL,                        C
20               ATTRB=(ASKIP,BRT)
21    APSOC3     DFHMDF INITIAL='____',                C
22               POS=(6,74),                           C
23               LENGTH=4,                             C
24               COLOR=NEUTRAL,                        C
25               ATTRB=(UNPROT,NUM,BRT,FSET)
26               DFHMDF POS=(6,79),                    C
27               LENGTH=1,                             C
28               ATTRB=(ASKIP,DRK)
29               DFHMDF INITIAL='NAME(L):',            C
30               POS=(7,3),                            C
31               LENGTH=8,                             C
32               COLOR=TURQUOISE,                      C
33               ATTRB=ASKIP
34               DFHMDF POS=(7,12),                    C
35               LENGTH=1,                             C
36               ATTRB=(ASKIP,DRK)
37    APLNME     DFHMDF INITIAL='_____',C
38               POS=(7,14),                           C
39               LENGTH=20,                            C
40               COLOR=NEUTRAL,                        C
41               ATTRB=(UNPROT,BRT,FSET)
42               DFHMDF POS=(7,35),                    C
43               LENGTH=1,                             C
44               ATTRB=(ASKIP,DRK)
45               DFHMDF INITIAL='NAME(F):',            C
46               POS=(7,38),                           C
47               LENGTH=8,                             C
48               COLOR=TURQUOISE,                      C
49               ATTRB=ASKIP
50               DFHMDF POS=(7,47),                    C
51               LENGTH=1,                             C
52               ATTRB=(ASKIP,DRK)
53    APFNME     DFHMDF INITIAL='_____',          C
54               POS=(7,49),                           C
55               LENGTH=10,                            C
56               COLOR=NEUTRAL,                        C
57               ATTRB=(UNPROT,BRT,FSET)
58               DFHMDF POS=(7,60),                    C
59               LENGTH=1,                             C
60               ATTRB=(ASKIP,DRK)
61               DFHMDF INITIAL='NAME(I):',            C
62               POS=(7,62),                           C
```

```
 1                    LENGTH=8,                                           C
 2                    COLOR=TURQUOISE,                                    C
 3                    ATTRB=ASKIP
 4              DFHMDF POS=(7,71),                                        C
 5                    LENGTH=1,                                           C
 6                    ATTRB=(ASKIP,DRK)
 7   APINME    DFHMDF INITIAL='_',                                        C
 8                    POS=(7,73),                                         C
 9                    LENGTH=1,                                           C
10                    COLOR=NEUTRAL,                                      C
11                    ATTRB=(UNPROT,BRT,FSET)
12              DFHMDF POS=(7,75),                                        C
13                    LENGTH=1,                                           C
14                    ATTRB=(ASKIP,DRK)
15              DFHMDF INITIAL='EMP#:',                                   C
16                    POS=(8,3),                                          C
17                    LENGTH=5,                                           C
18                    COLOR=TURQUOISE,                                    C
19                    ATTRB=ASKIP
20   APEMPN    DFHMDF INITIAL='_____',                             C
21                    POS=(8,9),                                          C
22                    LENGTH=12,                                          C
23                    COLOR=NEUTRAL,                                      C
24                    ATTRB=(UNPROT,BRT,FSET)
25              DFHMDF POS=(8,22),                                        C
26                    LENGTH=1,                                           C
27                    ATTRB=(ASKIP,DRK)
28              DFHMDF INITIAL='HIRED:',                                  C
29                    POS=(8,24),                                         C
30                    LENGTH=6,                                           C
31                    COLOR=TURQUOISE,                                    C
32                    ATTRB=ASKIP
33   APHDTE    DFHMDF INITIAL='YYMMDD',                                   C
34                    POS=(8,31),                                         C
35                    LENGTH=6,                                           C
36                    COLOR=NEUTRAL,                                      C
37                    ATTRB=(UNPROT,NUM,BRT,FSET)
38              DFHMDF INITIAL='SUPVR:',                                  C
39                    POS=(8,38),                                         C
40                    LENGTH=6,                                           C
41                    COLOR=TURQUOISE,                                    C
42                    ATTRB=ASKIP
43              DFHMDF POS=(8,45),                                        C
44                    LENGTH=1,                                           C
45                    ATTRB=(ASKIP,DRK)
46   APSVSR    DFHMDF INITIAL='_____',           C
47                    POS=(8,47),                                         C
48                    LENGTH=30,                                          C
49                    COLOR=NEUTRAL,                                      C
50                    ATTRB=(UNPROT,BRT,FSET)
51              DFHMDF POS=(8,78),                                        C
52                    LENGTH=1,                                           C
53                    ATTRB=(ASKIP,DRK)
54              DFHMDF INITIAL='ADDRESS:',                                C
55                    POS=(9,3),                                          C
56                    LENGTH=8,                                           C
57                    COLOR=TURQUOISE,                                    C
58                    ATTRB=ASKIP
59              DFHMDF POS=(9,12),                                        C
60                    LENGTH=1,                                           C
61                    ATTRB=(ASKIP,DRK)
62   APADDR    DFHMDF INITIAL='_____',        C
```

```
1                     POS=(9,14),                                     C
2                     LENGTH=35,                                      C
3                     COLOR=NEUTRAL,                                  C
4                     ATTRB=(UNPROT,BRT,FSET)
5               DFHMDF POS=(9,50),                                    C
6                     LENGTH=1,                                       C
7                     ATTRB=(ASKIP,DRK)
8               DFHMDF INITIAL='CITY    :',                           C
9                     POS=(10,3),                                     C
10                    LENGTH=8,                                       C
11                    COLOR=TURQUOISE,                                C
12                    ATTRB=ASKIP
13              DFHMDF POS=(10,12),                                   C
14                    LENGTH=1,                                       C
15                    ATTRB=(ASKIP,DRK)
16    APCITY    DFHMDF INITIAL='                              ',      C
17                    POS=(10,14),                                    C
18                    LENGTH=30,                                      C
19                    COLOR=NEUTRAL,                                  C
20                    ATTRB=(UNPROT,BRT,FSET)
21              DFHMDF POS=(10,45),                                   C
22                    LENGTH=1,                                       C
23                    ATTRB=(ASKIP,DRK)
24              DFHMDF INITIAL='STATE   :',                           C
25                    POS=(11,3),                                     C
26                    LENGTH=8,                                       C
27                    COLOR=TURQUOISE,                                C
28                    ATTRB=ASKIP
29              DFHMDF POS=(11,12),                                   C
30                    LENGTH=1,                                       C
31                    ATTRB=(ASKIP,DRK)
32    APST      DFHMDF INITIAL='__',                                  C
33                    POS=(11,14),                                    C
34                    LENGTH=2,                                       C
35                    COLOR=NEUTRAL,                                  C
36                    ATTRB=(UNPROT,BRT,FSET)
37              DFHMDF POS=(11,17),                                   C
38                    LENGTH=1,                                       C
39                    ATTRB=(ASKIP,DRK)
40              DFHMDF INITIAL='ZIP:',                                C
41                    POS=(11,26),                                    C
42                    LENGTH=4,                                       C
43                    COLOR=TURQUOISE,                                C
44                    ATTRB=ASKIP
45              DFHMDF POS=(11,31),                                   C
46                    LENGTH=1,                                       C
47                    ATTRB=(ASKIP,DRK)
48    APZIP1    DFHMDF INITIAL='_____',                               C
49                    POS=(11,33),                                    C
50                    LENGTH=5,                                       C
51                    COLOR=NEUTRAL,                                  C
52                    ATTRB=(UNPROT,NUM,BRT,FSET)
53              DFHMDF INITIAL='-',                                   C
54                    POS=(11,39),                                    C
55                    LENGTH=1,                                       C
56                    COLOR=NEUTRAL,                                  C
57                    ATTRB=(ASKIP,BRT)
58    APZIP2    DFHMDF INITIAL='____',                                C
59                    POS=(11,41),                                    C
60                    LENGTH=4,                                       C
61                    COLOR=NEUTRAL,                                  C
62                    ATTRB=(UNPROT,NUM,BRT,FSET)
```

```
 1              DFHMDF POS=(11,46),                    C
 2                     LENGTH=1,                       C
 3                     ATTRB=(ASKIP,DRK)
 4              DFHMDF INITIAL='HOME-PHONE:',          C
 5                     POS=(11,50),                    C
 6                     LENGTH=11,                      C
 7                     COLOR=TURQUOISE,                C
 8                     ATTRB=ASKIP
 9   APPHAC     DFHMDF INITIAL='000',                  C
10                     POS=(11,62),                   C
11                     LENGTH=3,                       C
12                     COLOR=NEUTRAL,                  C
13                     ATTRB=(UNPROT,NUM,BRT,FSET)
14              DFHMDF INITIAL='-',                    C
15                     POS=(11,66),                    C
16                     LENGTH=1,                       C
17                     COLOR=NEUTRAL,                  C
18                     ATTRB=(ASKIP,BRT)
19   APPHN1     DFHMDF INITIAL='000',                  C
20                     POS=(11,68),                    C
21                     LENGTH=3,                       C
22                     COLOR=NEUTRAL,                  C
23                     ATTRB=(UNPROT,NUM,BRT,FSET)
24              DFHMDF INITIAL='-',                    C
25                     POS=(11,72),                    C
26                     LENGTH=1,                       C
27                     COLOR=NEUTRAL,                  C
28                     ATTRB=(ASKIP,BRT)
29   APPHN2     DFHMDF INITIAL='0000',                 C
30                     POS=(11,74),                    C
31                     LENGTH=4,                       C
32                     COLOR=NEUTRAL,                  C
33                     ATTRB=(UNPROT,NUM,BRT,FSET)
34              DFHMDF POS=(11,79),                    C
35                     LENGTH=1,                       C
36                     ATTRB=(ASKIP,DRK)
37              DFHMDF INITIAL='SEX:',                 C
38                     POS=(12,3),                     C
39                     LENGTH=4,                       C
40                     COLOR=TURQUOISE,                C
41                     ATTRB=ASKIP
42              DFHMDF POS=(12,8),                     C
43                     LENGTH=1,                       C
44                     ATTRB=(ASKIP,DRK)
45   APSEX      DFHMDF INITIAL='_',                    C
46                     POS=(12,10),                    C
47                     LENGTH=1,                       C
48                     COLOR=NEUTRAL,                  C
49                     ATTRB=(UNPROT,BRT,FSET)
50              DFHMDF POS=(12,12),                    C
51                     LENGTH=1,                       C
52                     ATTRB=(ASKIP,DRK)
53              DFHMDF INITIAL='MARITAL-STATUS:',      C
54                     POS=(12,14),                    C
55                     LENGTH=15,                      C
56                     COLOR=TURQUOISE,                C
57                     ATTRB=ASKIP
58              DFHMDF POS=(12,30),                    C
59                     LENGTH=1,                       C
60                     ATTRB=(ASKIP,DRK)
61   APMARS     DFHMDF INITIAL='_',                    C
62                     POS=(12,32),                    C
```

```
                  LENGTH=1,                                              C
                  COLOR=NEUTRAL,                                         C
                  ATTRB=(UNPROT,BRT,FSET)
            DFHMDF POS=(12,34),                                          C
                  LENGTH=1,                                              C
                  ATTRB=(ASKIP,DRK)
            DFHMDF INITIAL='#DEP:',                                      C
                  POS=(12,36),                                           C
                  LENGTH=5,                                              C
                  COLOR=TURQUOISE,                                       C
                  ATTRB=ASKIP
            DFHMDF POS=(12,42),                                          C
                  LENGTH=1,                                              C
                  ATTRB=(ASKIP,DRK)
   APNDEP   DFHMDF INITIAL='__',                                         C
                  POS=(12,44),                                           C
                  LENGTH=2,                                              C
                  COLOR=NEUTRAL,                                         C
                  ATTRB=(UNPROT,NUM,BRT,FSET)
            DFHMDF POS=(12,47),                                          C
                  LENGTH=1,                                              C
                  ATTRB=(ASKIP,DRK)
            DFHMDF INITIAL='DOB:',                                       C
                  POS=(12,50),                                           C
                  LENGTH=4,                                              C
                  COLOR=TURQUOISE,                                       C
                  ATTRB=ASKIP
            DFHMDF POS=(12,55),                                          C
                  LENGTH=1,                                              C
                  ATTRB=(ASKIP,DRK)
   APDOB    DFHMDF INITIAL='YYMMDD',                                     C
                  POS=(12,57),                                           C
                  LENGTH=6,                                              C
                  COLOR=NEUTRAL,                                         C
                  ATTRB=(UNPROT,NUM,BRT,FSET)
            DFHMDF POS=(12,64),                                          C
                  LENGTH=1,                                              C
                  ATTRB=(ASKIP,DRK)
            DFHMDF INITIAL='EMRGCY :',                                   C
                  POS=(13,3),                                            C
                  LENGTH=8,                                              C
                  COLOR=TURQUOISE,                                       C
                  ATTRB=ASKIP
            DFHMDF POS=(13,12),                                          C
                  LENGTH=1,                                              C
                  ATTRB=(ASKIP,DRK)
   APEMRG   DFHMDF INITIAL='                              ',             C
                  POS=(13,14),                                           C
                  LENGTH=30,                                             C
                  COLOR=RED,                                             C
                  ATTRB=(UNPROT,BRT,FSET)
            DFHMDF POS=(13,45),                                          C
                  LENGTH=1,                                              C
                  ATTRB=(ASKIP,DRK)
            DFHMDF INITIAL='EMRG-PHONE:',                                C
                  POS=(13,50),                                           C
                  LENGTH=11,                                             C
                  COLOR=TURQUOISE,                                       C
                  ATTRB=ASKIP
   APEPAC   DFHMDF INITIAL='___',                                        C
                  POS=(13,62),                                           C
                  LENGTH=3,                                              C
```

```
 1                    COLOR=RED,                                       C
 2                    ATTRB=(UNPROT,BRT,FSET)
 3            DFHMDF INITIAL='-',                                      C
 4                    POS=(13,66),                                     C
 5                    LENGTH=1,                                        C
 6                    COLOR=NEUTRAL,                                   C
 7                    ATTRB=(ASKIP,BRT)
 8    APEPH1  DFHMDF INITIAL='   ',                                    C
 9                    POS=(13,68),                                     C
10                    LENGTH=3,                                        C
11                    COLOR=RED,                                       C
12                    ATTRB=(UNPROT,BRT,FSET)
13            DFHMDF INITIAL='-',                                      C
14                    POS=(13,72),                                     C
15                    LENGTH=1,                                        C
16                    COLOR=NEUTRAL,                                   C
17                    ATTRB=(ASKIP,BRT)
18    APEPHN2 DFHMDF INITIAL='    ',                                   C
19                    POS=(13,74),                                     C
20                    LENGTH=4,                                        C
21                    COLOR=RED,                                       C
22                    ATTRB=(UNPROT,BRT,FSET)
23            DFHMDF POS=(13,79),                                      C
24                    LENGTH=1,                                        C
25                    ATTRB=(ASKIP,DRK)
26            DFHMDF INITIAL='SPECIAL:',                               C
27                    POS=(14,3),                                      C
28                    LENGTH=8,                                        C
29                    COLOR=TURQUOISE,                                 C
30                    ATTRB=ASKIP
31            DFHMDF POS=(14,12),                                      C
32                    LENGTH=1,                                        C
33                    ATTRB=(ASKIP,DRK)
34    APSPEC  DFHMDF INITIAL='                              ',         C
35                    POS=(14,14),                                     C
36                    LENGTH=30,                                       C
37                    COLOR=RED,                                       C
38                    ATTRB=(UNPROT,BRT,FSET)
39            DFHMDF POS=(14,45),                                      C
40                    LENGTH=1,                                        C
41                    ATTRB=(ASKIP,DRK)
42            DFHMDF INITIAL='EMRG-EXTN :',                            C
43                    POS=(14,50),                                     C
44                    LENGTH=11,                                       C
45                    COLOR=TURQUOISE,                                 C
46                    ATTRB=ASKIP
47    APEPEXT DFHMDF INITIAL='      ',                                 C
48                    POS=(14,62),                                     C
49                    LENGTH=6,                                        C
50                    COLOR=RED,                                       C
51                    ATTRB=(UNPROT,BRT,FSET)
52            DFHMDF POS=(14,69),                                      C
53                    LENGTH=1,                                        C
54                    ATTRB=(ASKIP,DRK)
55            DFHMDF INITIAL='            P A Y  P R O F I L E  I N F O RC
56                    M A T I O N            ',                        C
57                    POS=(15,3),                                      C
58                    LENGTH=75,                                       C
59                    COLOR=TURQUOISE,                                 C
60                    HILIGHT=REVERSE,                                 C
61                    ATTRB=ASKIP
62            DFHMDF POS=(15,79),                                      C
```

```
 1                LENGTH=1,                           C
 2                ATTRB=(ASKIP,DRK)
 3           DFHMDF INITIAL='PAY-RATE:',              C
 4                POS=(16,3),                         C
 5                LENGTH=9,                           C
 6                COLOR=TURQUOISE,                    C
 7                ATTRB=ASKIP
 8   APPAYR  DFHMDF INITIAL='000.0000',               C
 9                POS=(16,13),                        C
10                LENGTH=8,                           C
11                COLOR=NEUTRAL,                      C
12                ATTRB=(UNPROT,NUM,BRT,FSET),        C
13                PICOUT='999.9999'
14           DFHMDF INITIAL='SAL-RATE: ',             C
15                POS=(16,22),                        C
16                LENGTH=10,                          C
17                COLOR=TURQUOISE,                    C
18                ATTRB=ASKIP
19   APSALR  DFHMDF INITIAL='00000.0000',             C
20                POS=(16,33),                        C
21                LENGTH=10,                          C
22                COLOR=NEUTRAL,                      C
23                ATTRB=(UNPROT,NUM,BRT,FSET),        C
24                PICOUT='99999.9999'
25           DFHMDF INITIAL='JOBCD:',                 C
26                POS=(16,44),                        C
27                LENGTH=6,                           C
28                COLOR=TURQUOISE,                    C
29                ATTRB=ASKIP
30   APJCDE  DFHMDF INITIAL='          ',             C
31                POS=(16,51),                        C
32                LENGTH=10,                          C
33                COLOR=NEUTRAL,                      C
34                ATTRB=(UNPROT,BRT,FSET)
35           DFHMDF INITIAL='DEPT:',                  C
36                POS=(16,62),                        C
37                LENGTH=5,                           C
38                COLOR=TURQUOISE,                    C
39                ATTRB=ASKIP
40   APDEPT  DFHMDF INITIAL='          ',             C
41                POS=(16,68),                        C
42                LENGTH=10,                          C
43                COLOR=NEUTRAL,                      C
44                ATTRB=(UNPROT,BRT,FSET)
45           DFHMDF POS=(16,79),                      C
46                LENGTH=1,                           C
47                ATTRB=(ASKIP,DRK)
48           DFHMDF INITIAL='SAL. Y/N:',              C
49                POS=(17,3),                         C
50                LENGTH=9,                           C
51                COLOR=TURQUOISE,                    C
52                ATTRB=ASKIP
53   APEXMP  DFHMDF INITIAL='N',                      C
54                POS=(17,13),                        C
55                LENGTH=1,                           C
56                COLOR=NEUTRAL,                      C
57                ATTRB=(UNPROT,BRT,FSET)
58           DFHMDF INITIAL='CLASS:',                 C
59                POS=(17,15),                        C
60                LENGTH=6,                           C
61                COLOR=TURQUOISE,                    C
62                ATTRB=ASKIP
```

```
 1    APCLASS   DFHMDF INITIAL='AE',                           C
 2              POS=(17,22),                                   C
 3              LENGTH=2,                                      C
 4              COLOR=NEUTRAL,                                 C
 5              ATTRB=(UNPROT,BRT,FSET)
 6              DFHMDF INITIAL='STATUS:',                      C
 7              POS=(17,25),                                   C
 8              LENGTH=7,                                      C
 9              COLOR=TURQUOISE,                               C
10              ATTRB=ASKIP
11    APSTAT    DFHMDF INITIAL='FR',                           C
12              POS=(17,33),                                   C
13              LENGTH=2,                                      C
14              COLOR=NEUTRAL,                                 C
15              ATTRB=(UNPROT,BRT,FSET)
16              DFHMDF INITIAL='OTX:',                         C
17              POS=(17,36),                                   C
18              LENGTH=4,                                      C
19              COLOR=TURQUOISE,                               C
20              ATTRB=ASKIP
21    APOTX     DFHMDF INITIAL='Y',                            C
22              POS=(17,41),                                   C
23              LENGTH=1,                                      C
24              COLOR=NEUTRAL,                                 C
25              ATTRB=(UNPROT,BRT,FSET)
26              DFHMDF INITIAL='HPX:',                         C
27              POS=(17,43),                                   C
28              LENGTH=4,                                      C
29              COLOR=TURQUOISE,                               C
30              ATTRB=ASKIP
31    APHPX     DFHMDF INITIAL='Y',                            C
32              POS=(17,48),                                   C
33              LENGTH=1,                                      C
34              COLOR=NEUTRAL,                                 C
35              ATTRB=(UNPROT,BRT,FSET)
36              DFHMDF INITIAL='WPX:',                         C
37              POS=(17,50),                                   C
38              LENGTH=4,                                      C
39              COLOR=TURQUOISE,                               C
40              ATTRB=ASKIP
41    APWPX     DFHMDF INITIAL='Y',                            C
42              POS=(17,55),                                   C
43              LENGTH=1,                                      C
44              COLOR=NEUTRAL,                                 C
45              ATTRB=(UNPROT,BRT,FSET)
46              DFHMDF INITIAL='SDX:',                         C
47              POS=(17,57),                                   C
48              LENGTH=4,                                      C
49              COLOR=TURQUOISE,                               C
50              ATTRB=ASKIP
51    APSDX     DFHMDF INITIAL='Y',                            C
52              POS=(17,62),                                   C
53              LENGTH=1,                                      C
54              COLOR=NEUTRAL,                                 C
55              ATTRB=(UNPROT,BRT,FSET)
56              DFHMDF INITIAL='OSX:',                         C
57              POS=(17,64),                                   C
58              LENGTH=4,                                      C
59              COLOR=TURQUOISE,                               C
60              ATTRB=ASKIP
61    APOSX     DFHMDF INITIAL='Y',                            C
62              POS=(17,69),                                   C
```

```
 1                    LENGTH=1,                                            C
 2                    COLOR=NEUTRAL,                                       C
 3                    ATTRB=(UNPROT,BRT,FSET)
 4             DFHMDF INITIAL='FLSA:',                                     C
 5                    POS=(17,71),                                         C
 6                    LENGTH=5,                                            C
 7                    COLOR=TURQUOISE,                                     C
 8                    ATTRB=ASKIP
 9      APFLSA DFHMDF INITIAL='N',                                         C
10                    POS=(17,77),                                         C
11                    LENGTH=1,                                            C
12                    COLOR=NEUTRAL,                                       C
13                    ATTRB=(UNPROT,BRT,FSET)
14             DFHMDF POS=(17,79),                                         C
15                    LENGTH=1,                                            C
16                    ATTRB=(ASKIP,DRK)
17             DFHMDF INITIAL='AUTOMATIC-GENERATION:',                     C
18                    POS=(18,3),                                          C
19                    LENGTH=21,                                           C
20                    COLOR=TURQUOISE,                                     C
21                    ATTRB=ASKIP
22      APAUTG DFHMDF INITIAL='N',                                         C
23                    POS=(18,25),                                         C
24                    LENGTH=1,                                            C
25                    COLOR=NEUTRAL,                                       C
26                    ATTRB=(UNPROT,BRT,FSET)
27             DFHMDF INITIAL='AUTOMATIC-PAY:',                            C
28                    POS=(18,27),                                         C
29                    LENGTH=14,                                           C
30                    COLOR=TURQUOISE,                                     C
31                    ATTRB=ASKIP
32      APAUTP DFHMDF INITIAL='N',                                         C
33                    POS=(18,42),                                         C
34                    LENGTH=1,                                            C
35                    COLOR=NEUTRAL,                                       C
36                    ATTRB=(UNPROT,BRT,FSET)
37             DFHMDF INITIAL='AUTOMATIC-OVT:',                            C
38                    POS=(18,44),                                         C
39                    LENGTH=14,                                           C
40                    COLOR=TURQUOISE,                                     C
41                    ATTRB=ASKIP
42      APAUTO DFHMDF INITIAL='N',                                         C
43                    POS=(18,59),                                         C
44                    LENGTH=1,                                            C
45                    COLOR=NEUTRAL,                                       C
46                    ATTRB=(UNPROT,BRT,FSET)
47             DFHMDF INITIAL='AUTOMATIC-SD :',                            C
48                    POS=(18,61),                                         C
49                    LENGTH=14,                                           C
50                    COLOR=TURQUOISE,                                     C
51                    ATTRB=ASKIP
52      APAUTS DFHMDF INITIAL='N',                                         C
53                    POS=(18,76),                                         C
54                    LENGTH=1,                                            C
55                    COLOR=NEUTRAL,                                       C
56                    ATTRB=(UNPROT,BRT,FSET)
57             DFHMDF POS=(18,78),                                         C
58                    LENGTH=1,                                            C
59                    ATTRB=(ASKIP,DRK)
60             DFHMDF INITIAL='COLA:',                                     C
61                    POS=(19,3),                                          C
62                    LENGTH=5,                                            C
```

```
 1                  COLOR=TURQUOISE,                             C
 2                  ATTRB=ASKIP
 3    APCOLA   DFHMDF INITIAL='N',                               C
 4                  POS=(19,9),                                  C
 5                  LENGTH=1,                                    C
 6                  COLOR=NEUTRAL,                               C
 7                  ATTRB=(UNPROT,BRT,FSET)
 8             DFHMDF INITIAL='LONGEVITY-PAY:',                  C
 9                  POS=(19,11),                                 C
10                  LENGTH=14,                                   C
11                  COLOR=TURQUOISE,                             C
12                  ATTRB=ASKIP
13    APLNGP   DFHMDF INITIAL='N',                               C
14                  POS=(19,26),                                 C
15                  LENGTH=1,                                    C
16                  COLOR=NEUTRAL,                               C
17                  ATTRB=(UNPROT,BRT,FSET)
18             DFHMDF INITIAL='SPEC1:',                          C
19                  POS=(19,28),                                 C
20                  LENGTH=6,                                    C
21                  COLOR=TURQUOISE,                             C
22                  ATTRB=ASKIP
23    APSPC1   DFHMDF INITIAL='N',                               C
24                  POS=(19,35),                                 C
25                  LENGTH=1,                                    C
26                  COLOR=NEUTRAL,                               C
27                  ATTRB=(UNPROT,BRT,FSET)
28             DFHMDF INITIAL='SPEC2:',                          C
29                  POS=(19,37),                                 C
30                  LENGTH=6,                                    C
31                  COLOR=TURQUOISE,                             C
32                  ATTRB=ASKIP
33    APSPC2   DFHMDF INITIAL='N',                               C
34                  POS=(19,44),                                 C
35                  LENGTH=1,                                    C
36                  COLOR=NEUTRAL,                               C
37                  ATTRB=(UNPROT,BRT,FSET)
38             DFHMDF INITIAL='SPEC3:',                          C
39                  POS=(19,46),                                 C
40                  LENGTH=6,                                    C
41                  COLOR=TURQUOISE,                             C
42                  ATTRB=ASKIP
43    APSPC3   DFHMDF INITIAL='N',                               C
44                  POS=(19,53),                                 C
45                  LENGTH=1,                                    C
46                  COLOR=NEUTRAL,                               C
47                  ATTRB=(UNPROT,BRT,FSET)
48             DFHMDF POS=(19,55),                               C
49                  LENGTH=1,                                    C
50                  ATTRB=(ASKIP,DRK)
51             DFHMDF INITIAL='PAY-POLICY:',                     C
52                  POS=(20,3),                                  C
53                  LENGTH=11,                                   C
54                  COLOR=TURQUOISE,                             C
55                  ATTRB=ASKIP
56    APPPOL   DFHMDF INITIAL='000',                             C
57                  POS=(20,15),                                 C
58                  LENGTH=3,                                    C
59                  COLOR=NEUTRAL,                               C
60                  ATTRB=(UNPROT,BRT,FSET)
61             DFHMDF INITIAL='SD-POLICY:',                      C
62                  POS=(20,19),                                 C
```

```
 1                 LENGTH=10,                           C
 2                 COLOR=TURQUOISE,                     C
 3                 ATTRB=ASKIP
 4    APSDP    DFHMDF INITIAL='000',                    C
 5                 POS=(20,30),                         C
 6                 LENGTH=3,                            C
 7                 COLOR=NEUTRAL,                       C
 8                 ATTRB=(UNPROT,BRT,FSET)
 9             DFHMDF INITIAL='ABS-SCD:',               C
10                 POS=(20,34),                         C
11                 LENGTH=8,                            C
12                 COLOR=TURQUOISE,                     C
13                 ATTRB=ASKIP
14    APASCHD  DFHMDF INITIAL='000',                    C
15                 POS=(20,43),                         C
16                 LENGTH=3,                            C
17                 COLOR=NEUTRAL,                       C
18                 ATTRB=(UNPROT,BRT,FSET)
19             DFHMDF POS=(20,47),                      C
20                 LENGTH=1,                            C
21                 ATTRB=(ASKIP,DRK)
22             DFHMDF INITIAL='WORK-SCHED:',            C
23                 POS=(21,3),                          C
24                 LENGTH=11,                           C
25                 COLOR=TURQUOISE,                     C
26                 ATTRB=ASKIP
27    APSCHED  DFHMDF INITIAL='000',                    C
28                 POS=(21,15),                         C
29                 LENGTH=3,                            C
30                 COLOR=NEUTRAL,                       C
31                 ATTRB=(UNPROT,BRT,FSET)
32             DFHMDF INITIAL='WORK-PLAN:',             C
33                 POS=(21,19),                         C
34                 LENGTH=10,                           C
35                 COLOR=TURQUOISE,                     C
36                 ATTRB=ASKIP
37    APWRKP   DFHMDF INITIAL='000',                    C
38                 POS=(21,30),                         C
39                 LENGTH=3,                            C
40                 COLOR=NEUTRAL,                       C
41                 ATTRB=(UNPROT,BRT,FSET)
42             DFHMDF INITIAL='SHIFT:   ',              C
43                 POS=(21,34),                         C
44                 LENGTH=8,                            C
45                 COLOR=TURQUOISE,                     C
46                 ATTRB=ASKIP
47    APSHFT   DFHMDF INITIAL='000',                    C
48                 POS=(21,43),                         C
49                 LENGTH=3,                            C
50                 COLOR=NEUTRAL,                       C
51                 ATTRB=(UNPROT,BRT,FSET)
52             DFHMDF POS=(21,47),                      C
53                 LENGTH=1,                            C
54                 ATTRB=(ASKIP,DRK)
55             DFHMDF INITIAL='UF1T:',                  C
56                 POS=(23,3),                          C
57                 LENGTH=5,                            C
58                 COLOR=TURQUOISE,                     C
59                 ATTRB=ASKIP
60    APUF1    DFHMDF INITIAL='          ',             C
61                 POS=(23,9),                          C
62                 LENGTH=10,                           C
```

```
 1                     COLOR=NEUTRAL,                                            C
 2                     ATTRB=(UNPROT,BRT,FSET)
 3              DFHMDF INITIAL='UC1:',                                           C
 4                     POS=(23,20),                                              C
 5                     LENGTH=4,                                                 C
 6                     COLOR=TURQUOISE,                                          C
 7                     ATTRB=ASKIP
 8     APUC1    DFHMDF INITIAL='_____',                                     C
 9                     POS=(23,25),                                              C
10                     LENGTH=10,                                                C
11                     COLOR=NEUTRAL,                                            C
12                     ATTRB=(UNPROT,BRT,FSET)
13              DFHMDF INITIAL='         ',                                      C
14                     POS=(23,36),                                              C
15                     LENGTH=9,                                                 C
16                     ATTRB=(ASKIP,DRK,FSET)
17              DFHMDF INITIAL='UF2T:',                                          C
18                     POS=(23,46),                                              C
19                     LENGTH=5,                                                 C
20                     COLOR=TURQUOISE,                                          C
21                     ATTRB=ASKIP
22     APUF2    DFHMDF INITIAL='_____',                                     C
23                     POS=(23,52),                                              C
24                     LENGTH=10,                                                C
25                     COLOR=NEUTRAL,                                            C
26                     ATTRB=(UNPROT,BRT,FSET)
27              DFHMDF INITIAL='UC2:',                                           C
28                     POS=(23,63),                                              C
29                     LENGTH=4,                                                 C
30                     COLOR=TURQUOISE,                                          C
31                     ATTRB=ASKIP
32     APUC2    DFHMDF INITIAL='_____',                                     C
33                     POS=(23,68),                                              C
34                     LENGTH=10,                                                C
35                     COLOR=NEUTRAL,                                            C
36                     ATTRB=(UNPROT,BRT,FSET)
37              DFHMDF POS=(23,79),                                              C
38                     LENGTH=1,                                                 C
39                     ATTRB=(ASKIP,DRK)
40              DFHMDF INITIAL=' PF1=HELP ---------------------------------------C
41                     -------------------- PF9=END  ',                          C
42                     POS=(24,2),                                               C
43                     LENGTH=76,                                                C
44                     COLOR=TURQUOISE,                                          C
45                     HILIGHT=REVERSE,                                          C
46                     ATTRB=ASKIP
47     * ------------------------------------------------------------------*
48     IN353AH  DFHMDI CTRL=(FRSET,FREEKB),                                      C
49                     EXTATT=YES,                                               C
50                     TIOAPFX=YES,                                              C
51                     SIZE=(24,80),                                             C
52                     COLUMN=00001,                                             C
53                     LINE=00001
54              DFHMDF INITIAL='                                                 C
55                     ',                                                        C
56                     POS=(2,29),                                               C
57                     LENGTH=49,                                                C
58                     COLOR=BLUE,                                               C
59                     HILIGHT=REVERSE,                                          C
60                     ATTRB=ASKIP
61              DFHMDF POS=(2,79),                                               C
62                     LENGTH=1,                                                 C
```

```
 1                ATTRB=(ASKIP,DRK)
 2           DFHMDF INITIAL=' ',                              C
 3                POS=(3,29),                                 C
 4                LENGTH=1,                                   C
 5                COLOR=BLUE,                                 C
 6                HILIGHT=REVERSE,                            C
 7                ATTRB=ASKIP
 8   APM01   DFHMDF INITIAL='                               'C
 9                ',                                          C
10                POS=(3,31),                                 C
11                LENGTH=45,                                  C
12                COLOR=NEUTRAL,                              C
13                HILIGHT=REVERSE,                            C
14                ATTRB=(ASKIP,IC,FSET)
15           DFHMDF INITIAL=' ',                              C
16                POS=(3,77),                                 C
17                LENGTH=1,                                   C
18                COLOR=BLUE,                                 C
19                HILIGHT=REVERSE,                            C
20                ATTRB=ASKIP
21           DFHMDF POS=(3,79),                               C
22                LENGTH=1,                                   C
23                ATTRB=ASKIP
24           DFHMDF INITIAL=' ',                              C
25                POS=(4,29),                                 C
26                LENGTH=1,                                   C
27                COLOR=BLUE,                                 C
28                HILIGHT=REVERSE,                            C
29                ATTRB=ASKIP
30   APM02   DFHMDF INITIAL='        P O P - U P    H E L P  'C
31                ',                                          C
32                POS=(4,31),                                 C
33                LENGTH=45,                                  C
34                COLOR=NEUTRAL,                              C
35                HILIGHT=REVERSE,                            C
36                ATTRB=(ASKIP,FSET)
37           DFHMDF INITIAL=' ',                              C
38                POS=(4,77),                                 C
39                LENGTH=1,                                   C
40                COLOR=BLUE,                                 C
41                HILIGHT=REVERSE,                            C
42                ATTRB=ASKIP
43           DFHMDF POS=(4,79),                               C
44                LENGTH=1,                                   C
45                ATTRB=ASKIP
46           DFHMDF INITIAL=' ',                              C
47                POS=(5,29),                                 C
48                LENGTH=1,                                   C
49                COLOR=BLUE,                                 C
50                HILIGHT=REVERSE,                            C
51                ATTRB=ASKIP
52   APM03   DFHMDF INITIAL='                               'C
53                ',                                          C
54                POS=(5,31),                                 C
55                LENGTH=45,                                  C
56                COLOR=NEUTRAL,                              C
57                HILIGHT=REVERSE,                            C
58                ATTRB=(ASKIP,FSET)
59           DFHMDF INITIAL=' ',                              C
60                POS=(5,77),                                 C
61                LENGTH=1,                                   C
62                COLOR=BLUE,                                 C
```

```
 1                   HILIGHT=REVERSE,                                 C
 2                   ATTRB=ASKIP
 3              DFHMDF POS=(5,79),                                    C
 4                   LENGTH=1,                                        C
 5                   ATTRB=ASKIP
 6              DFHMDF INITIAL=' ',                                   C
 7                   POS=(6,29),                                      C
 8                   LENGTH=1,                                        C
 9                   COLOR=BLUE,                                      C
10                   HILIGHT=REVERSE,                                 C
11                   ATTRB=ASKIP
12   APM04      DFHMDF INITIAL='    THIS FUNCTION ALLOWS THE USER TO MASS   'C
13                   ',
14                   POS=(6,31),                                      C
15                   LENGTH=45,                                       C
16                   COLOR=NEUTRAL,                                   C
17                   HILIGHT=REVERSE,                                 C
18                   ATTRB=(ASKIP,FSET)
19              DFHMDF INITIAL=' ',                                   C
20                   POS=(6,77),                                      C
21                   LENGTH=1,                                        C
22                   COLOR=BLUE,                                      C
23                   HILIGHT=REVERSE,                                 C
24                   ATTRB=ASKIP
25              DFHMDF POS=(6,79),                                    C
26                   LENGTH=1,                                        C
27                   ATTRB=ASKIP
28              DFHMDF INITIAL=' ',                                   C
29                   POS=(7,29),                                      C
30                   LENGTH=1,                                        C
31                   COLOR=BLUE,                                      C
32                   HILIGHT=REVERSE,                                 C
33                   ATTRB=ASKIP
34   APM05      DFHMDF INITIAL='    INPUT TAMS DATA INTO THE TAMS MASTER   'C
35                   ',
36                   POS=(7,31),                                      C
37                   LENGTH=45,                                       C
38                   COLOR=NEUTRAL,                                   C
39                   HILIGHT=REVERSE,                                 C
40                   ATTRB=(ASKIP,FSET)
41              DFHMDF INITIAL=' ',                                   C
42                   POS=(7,77),                                      C
43                   LENGTH=1,                                        C
44                   COLOR=BLUE,                                      C
45                   HILIGHT=REVERSE,                                 C
46                   ATTRB=ASKIP
47              DFHMDF POS=(7,79),                                    C
48                   LENGTH=1,                                        C
49                   ATTRB=ASKIP
50              DFHMDF INITIAL=' ',                                   C
51                   POS=(8,29),                                      C
52                   LENGTH=1,                                        C
53                   COLOR=BLUE,                                      C
54                   HILIGHT=REVERSE,                                 C
55                   ATTRB=ASKIP
56   APM06      DFHMDF INITIAL='    FILE.                             'C
57                   ',
58                   POS=(8,31),                                      C
59                   LENGTH=45,                                       C
60                   COLOR=NEUTRAL,                                   C
61                   HILIGHT=REVERSE,                                 C
62                   ATTRB=(ASKIP,FSET)
```

```
 1              DFHMDF INITIAL=' ',                                              C
 2                     POS=(8,77),                                               C
 3                     LENGTH=1,                                                 C
 4                     COLOR=BLUE,                                               C
 5                     HILIGHT=REVERSE,                                          C
 6                     ATTRB=ASKIP
 7              DFHMDF POS=(8,79),                                               C
 8                     LENGTH=1,                                                 C
 9                     ATTRB=ASKIP
10              DFHMDF INITIAL=' ',                                              C
11                     POS=(9,29),                                               C
12                     LENGTH=1,                                                 C
13                     COLOR=BLUE,                                               C
14                     HILIGHT=REVERSE,                                          C
15                     ATTRB=ASKIP
16   APM07      DFHMDF INITIAL='    PF2 = GO TO THE BEGINNING OF THE BATCH     'C
17                     ,                                                         C
18                     POS=(9,31),                                               C
19                     LENGTH=45,                                                C
20                     COLOR=NEUTRAL,                                            C
21                     HILIGHT=REVERSE,                                          C
22                     ATTRB=(ASKIP,FSET)
23              DFHMDF INITIAL=' ',                                              C
24                     POS=(9,77),                                               C
25                     LENGTH=1,                                                 C
26                     COLOR=BLUE,                                               C
27                     HILIGHT=REVERSE,                                          C
28                     ATTRB=ASKIP
29              DFHMDF POS=(9,79),                                               C
30                     LENGTH=1,                                                 C
31                     ATTRB=ASKIP
32              DFHMDF INITIAL=' ',                                              C
33                     POS=(10,29),                                              C
34                     LENGTH=1,                                                 C
35                     COLOR=BLUE,                                               C
36                     HILIGHT=REVERSE,                                          C
37                     ATTRB=ASKIP
38   APM08      DFHMDF INITIAL='    PF3 = UPDATE THIS RECORD                   'C
39                     ,                                                         C
40                     POS=(10,31),                                              C
41                     LENGTH=45,                                                C
42                     COLOR=NEUTRAL,                                            C
43                     HILIGHT=REVERSE,                                          C
44                     ATTRB=(ASKIP,FSET)
45              DFHMDF INITIAL=' ',                                              C
46                     POS=(10,77),                                              C
47                     LENGTH=1,                                                 C
48                     COLOR=BLUE,                                               C
49                     HILIGHT=REVERSE,                                          C
50                     ATTRB=ASKIP
51              DFHMDF POS=(10,79),                                              C
52                     LENGTH=1,                                                 C
53                     ATTRB=ASKIP
54              DFHMDF INITIAL=' ',                                              C
55                     POS=(11,29),                                              C
56                     LENGTH=1,                                                 C
57                     COLOR=BLUE,                                               C
58                     HILIGHT=REVERSE,                                          C
59                     ATTRB=ASKIP
60   APM09      DFHMDF INITIAL='    PF4 = INSERT RECORDS                       'C
61                     ,                                                         C
62                     POS=(11,31),                                              C
```

```
 1                LENGTH=45,                                          C
 2                COLOR=NEUTRAL,                                      C
 3                HILIGHT=REVERSE,                                    C
 4                ATTRB=(ASKIP,FSET)
 5          DFHMDF INITIAL=' ',                                       C
 6                POS=(11,77),                                        C
 7                LENGTH=1,                                           C
 8                COLOR=BLUE,                                         C
 9                HILIGHT=REVERSE,                                    C
10                ATTRB=ASKIP
11          DFHMDF POS=(11,79),                                       C
12                LENGTH=1,                                           C
13                ATTRB=ASKIP
14          DFHMDF INITIAL=' ',                                       C
15                POS=(12,29),                                        C
16                LENGTH=1,                                           C
17                COLOR=BLUE,                                         C
18                HILIGHT=REVERSE,                                    C
19                ATTRB=ASKIP
20 APM10    DFHMDF INITIAL='    PF5 = NAME SEARCH (ADD MODE ONLY)    'C
21                ,                                                   C
22                POS=(12,31),                                        C
23                LENGTH=45,                                          C
24                COLOR=NEUTRAL,                                      C
25                HILIGHT=REVERSE,                                    C
26                ATTRB=(ASKIP,FSET)
27          DFHMDF INITIAL=' ',                                       C
28                POS=(12,77),                                        C
29                LENGTH=1,                                           C
30                COLOR=BLUE,                                         C
31                HILIGHT=REVERSE,                                    C
32                ATTRB=ASKIP
33          DFHMDF POS=(12,79),                                       C
34                LENGTH=1,                                           C
35                ATTRB=ASKIP
36          DFHMDF INITIAL=' ',                                       C
37                POS=(13,29),                                        C
38                LENGTH=1,                                           C
39                COLOR=BLUE,                                         C
40                HILIGHT=REVERSE,                                    C
41                ATTRB=ASKIP
42 APM11    DFHMDF INITIAL='                                         'C
43                ,                                                   C
44                POS=(13,31),                                        C
45                LENGTH=45,                                          C
46                COLOR=NEUTRAL,                                      C
47                HILIGHT=REVERSE,                                    C
48                ATTRB=(ASKIP,FSET)
49          DFHMDF INITIAL=' ',                                       C
50                POS=(13,77),                                        C
51                LENGTH=1,                                           C
52                COLOR=BLUE,                                         C
53                HILIGHT=REVERSE,                                    C
54                ATTRB=ASKIP
55          DFHMDF POS=(13,79),                                       C
56                LENGTH=1,                                           C
57                ATTRB=(ASKIP,NORM)
58          DFHMDF INITIAL=' ',                                       C
59                POS=(14,29),                                        C
60                LENGTH=1,                                           C
61                COLOR=BLUE,                                         C
62                HILIGHT=REVERSE,                                    C
```

```
 1                  ATTRB=ASKIP
 2     APM12        DFHMDF INITIAL='     PF7 = PAGE BACKWARD                  'C
 3                         ',                                                  C
 4                         POS=(14,31),                                        C
 5                         LENGTH=45,                                          C
 6                         COLOR=NEUTRAL,                                      C
 7                         HILIGHT=REVERSE,                                    C
 8                         ATTRB=(ASKIP,FSET)
 9                  DFHMDF INITIAL=' ',                                        C
10                         POS=(14,77),                                        C
11                         LENGTH=1,                                           C
12                         COLOR=BLUE,                                         C
13                         HILIGHT=REVERSE,                                    C
14                         ATTRB=ASKIP
15                  DFHMDF POS=(14,79),                                        C
16                         LENGTH=1,                                           C
17                         ATTRB=(ASKIP,NORM)
18                  DFHMDF INITIAL=' ',                                        C
19                         POS=(15,29),                                        C
20                         LENGTH=1,                                           C
21                         COLOR=BLUE,                                         C
22                         HILIGHT=REVERSE,                                    C
23                         ATTRB=ASKIP
24     APM13        DFHMDF INITIAL='     PF8 = PAGE FORWARD                   'C
25                         ',                                                  C
26                         POS=(15,31),                                        C
27                         LENGTH=45,                                          C
28                         COLOR=NEUTRAL,                                      C
29                         HILIGHT=REVERSE,                                    C
30                         ATTRB=(ASKIP,FSET)
31                  DFHMDF INITIAL=' ',                                        C
32                         POS=(15,77),                                        C
33                         LENGTH=1,                                           C
34                         COLOR=BLUE,                                         C
35                         HILIGHT=REVERSE,                                    C
36                         ATTRB=ASKIP
37                  DFHMDF POS=(15,79),                                        C
38                         LENGTH=1,                                           C
39                         ATTRB=(ASKIP,NORM)
40                  DFHMDF INITIAL=' ',                                        C
41                         POS=(16,29),                                        C
42                         LENGTH=1,                                           C
43                         COLOR=BLUE,                                         C
44                         HILIGHT=REVERSE,                                    C
45                         ATTRB=ASKIP
46     APM14        DFHMDF INITIAL='     PF9 = END - INVOKE BALANCE           'C
47                         ',                                                  C
48                         POS=(16,31),                                        C
49                         LENGTH=45,                                          C
50                         COLOR=NEUTRAL,                                      C
51                         HILIGHT=REVERSE,                                    C
52                         ATTRB=(ASKIP,FSET)
53                  DFHMDF INITIAL=' ',                                        C
54                         POS=(16,77),                                        C
55                         LENGTH=1,                                           C
56                         COLOR=BLUE,                                         C
57                         HILIGHT=REVERSE,                                    C
58                         ATTRB=ASKIP
59                  DFHMDF POS=(16,79),                                        C
60                         LENGTH=1,                                           C
61                         ATTRB=(ASKIP,NORM)
62                  DFHMDF INITIAL=' ',                                        C
```

```
 1                POS=(17,29),                                              C
 2                LENGTH=1,                                                 C
 3                COLOR=BLUE,                                               C
 4                HILIGHT=REVERSE,                                          C
 5                ATTRB=ASKIP
 6   APM15   DFHMDF INITIAL='                                              'C
 7                ,                                                         C
 8                POS=(17,31),                                              C
 9                LENGTH=45,                                                C
10                COLOR=NEUTRAL,                                            C
11                HILIGHT=REVERSE,                                          C
12                ATTRB=(ASKIP,FSET)
13           DFHMDF INITIAL=' ',                                            C
14                POS=(17,77),                                              C
15                LENGTH=1,                                                 C
16                COLOR=BLUE,                                               C
17                HILIGHT=REVERSE,                                          C
18                ATTRB=ASKIP
19           DFHMDF POS=(17,79),                                            C
20                LENGTH=1,                                                 C
21                ATTRB=(ASKIP,NORM)
22           DFHMDF INITIAL=' ',                                            C
23                POS=(18,29),                                              C
24                LENGTH=1,                                                 C
25                COLOR=BLUE,                                               C
26                HILIGHT=REVERSE,                                          C
27                ATTRB=ASKIP
28   APM16   DFHMDF INITIAL='    PF11 = SESSION TEMPLATES (UPDATE)         'C
29                ,                                                         C
30                POS=(18,31),                                              C
31                LENGTH=45,                                                C
32                COLOR=NEUTRAL,                                            C
33                HILIGHT=REVERSE,                                          C
34                ATTRB=(ASKIP,FSET)
35           DFHMDF INITIAL=' ',                                            C
36                POS=(18,77),                                              C
37                LENGTH=1,                                                 C
38                COLOR=BLUE,                                               C
39                HILIGHT=REVERSE,                                          C
40                ATTRB=ASKIP
41           DFHMDF POS=(18,79),                                            C
42                LENGTH=1,                                                 C
43                ATTRB=(ASKIP,NORM)
44           DFHMDF INITIAL=' ',                                            C
45                POS=(19,29),                                              C
46                LENGTH=1,                                                 C
47                COLOR=BLUE,                                               C
48                HILIGHT=REVERSE,                                          C
49                ATTRB=ASKIP
50   APM17   DFHMDF INITIAL='    PF12 = DELETE THIS RECORD                 'C
51                ,                                                         C
52                POS=(19,31),                                              C
53                LENGTH=45,                                                C
54                COLOR=NEUTRAL,                                            C
55                HILIGHT=REVERSE,                                          C
56                ATTRB=(ASKIP,FSET)
57           DFHMDF INITIAL=' ',                                            C
58                POS=(19,77),                                              C
59                LENGTH=1,                                                 C
60                COLOR=BLUE,                                               C
61                HILIGHT=REVERSE,                                          C
62                ATTRB=ASKIP
```

```
 1              DFHMDF POS=(19,79),                           C
 2                     LENGTH=1,                              C
 3                     ATTRB=(ASKIP,NORM)
 4              DFHMDF INITIAL=' ',                           C
 5                     POS=(20,29),                           C
 6                     LENGTH=1,                              C
 7                     COLOR=BLUE,                            C
 8                     HILIGHT=REVERSE,                       C
 9                     ATTRB=ASKIP
10     APM18    DFHMDF INITIAL='                             'C
11                     ',                                     C
12                     POS=(20,31),                           C
13                     LENGTH=45,                             C
14                     COLOR=NEUTRAL,                         C
15                     HILIGHT=REVERSE,                       C
16                     ATTRB=(ASKIP,FSET)
17              DFHMDF INITIAL=' ',                           C
18                     POS=(20,77),                           C
19                     LENGTH=1,                              C
20                     COLOR=BLUE,                            C
21                     HILIGHT=REVERSE,                       C
22                     ATTRB=ASKIP
23              DFHMDF POS=(20,79),                           C
24                     LENGTH=1,                              C
25                     ATTRB=(ASKIP,NORM)
26              DFHMDF INITIAL='                              C
27                     ',                                     C
28                     POS=(21,29),                           C
29                     LENGTH=49,                             C
30                     COLOR=BLUE,                            C
31                     HILIGHT=REVERSE,                       C
32                     ATTRB=ASKIP
33              DFHMDF POS=(21,79),                           C
34                     LENGTH=1,                              C
35                     ATTRB=(ASKIP,DRK)
36              DFHMSD TYPE=FINAL
37              END
38
39
```

Thus is described the manner in which a video display of multiple, partially and/or completely overlaid window panes representing cascaded user interface contexts can be created and managed by a CICS application program relying solely on standard and widely available CICS components and features and the techniques of the present invention.

It is to be understood that while we have illustrated and described certain forms of my invention, it is not to be limited to the specific forms or arrangement of parts herein describe and shown. It will be apparent to those skilled in the art that various changes may be made without departing from the scope of the invention and the invention is not to be considered limited to what is shown in the drawings and described in the specification.

What is claimed is:

1. A method of managing a plurality of video display windows which partially or completely overlap each other as manifested by native-mode 3270 data streams originating from the execution of BMS maps, relying solely on the standard video display facilities of BMS plus support for extended attributes, as a representation of nested or cascaded user interface input/output contexts within a CICS application program, said method comprising:

preventing a video display image of a base pane from interfering with a video display of an overlay pane;

preserving critical field attribute values of a base map created from said overlay panes;

managing a data entry cursor so that it is active on either said base pane or said overlay pane in accordance with a switching of user interface contexts during creation and subsequent destruction of said overlay pane;

representing BMS field attribute values and processing control variable values as bit patterns;

means for storing said bit patterns as bit map files in accordance with a specific ordering of overlay panes and their associated user interface contexts;

means for restoring said bit patterns as bit map files in accordance with a specific ordering of overlay panes and their associated user interface contexts;

allowing dynamic changes to the contents of said overlay pane as performed by users of the CICS application program and for said overlay pane changes to be stored for subsequent retrieval;

means for sequencing BMS maps which maintains a synchronization of a native-mode 3270 data streams produced by the execution of said maps and the corresponding user interface contexts as presented to the user during windowing which employs said method for managing the data entry cursor, said methods of bit map file construction and their subsequent rapid storage and retrieval and accommodates changes to the contents of overlay panes for producing, storing and retrieving such changes.

2. The method of managing video display windows according to claim 1 wherein said means for storing and restoring the bit map is further defined as FILO.

3. The method of managing video display windows according to claim 1 including a step of arranging critical BMS field attributes on base maps and for the placement of overlay panes to preserve said critical field attributes.

4. The method of managing video display windows according to claim 1 including a step of constructing bit maps which represent BMS video display elements and associated processing control variable values that can be stored for subsequent retrieval and use.

5. The method of managing video display windows according to claim 1 including a step of optimizing the storage and retrieval for said bit map files to eliminate undesirable video effects during overlay pane creation and destruction.

6. The method of managing video display windows according to claim 1 including a step for managing the data entry cursor to insure its activation on either a base pane or an overlay pane.

7. The method of managing video display windows according to claim 1 including a step method for incorporating user-performed changes in the contents of an overlay pane.

* * * * *